No. 750,652. PATENTED JAN. 26, 1904.
E. N. HUMPHREY.
HOSE SUPPORTER.
APPLICATION FILED AUG. 13, 1903.
NO MODEL.
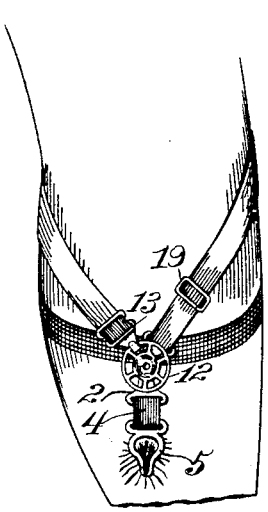
*Fig. 1.*
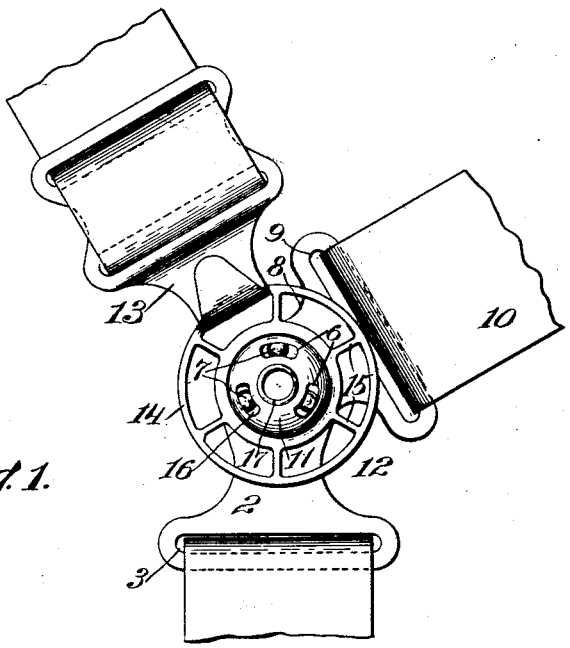
*Fig. 2.*
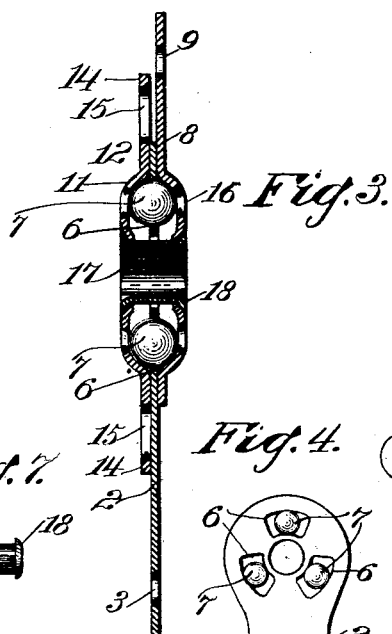
*Fig. 3.* *Fig. 4.* *Fig. 5.* *Fig. 6.*
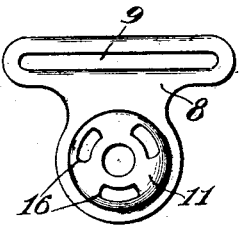
*Fig. 7.*
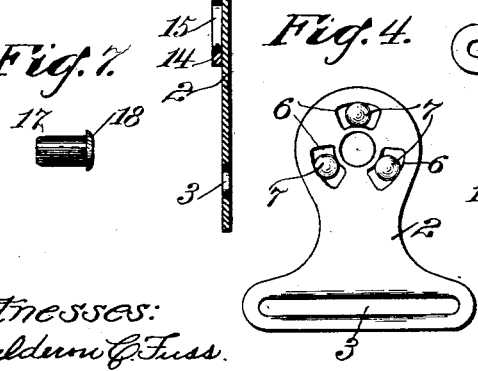
Witnesses:
Galdwin G. Fuss
E. A. Jarvis
Inventor:
Ernest N. Humphrey.
By his Attorney,
F. H. Richards No. 750,652. Patented January 26, 1904.

UNITED STATES PATENT OFFICE.

ERNEST N. HUMPHREY, OF NEW BRITAIN, CONNECTICUT, ASSIGNOR TO THE TRAUT & HINE MANUFACTURING COMPANY, OF NEW BRITAIN, CONNECTICUT, A CORPORATION OF CONNECTICUT.

HOSE-SUPPORTER.

SPECIFICATION forming part of Letters Patent No. 750,652, dated January 26, 1904.

Application filed August 13, 1903. Serial No. 169,377. (No model.)

*To all whom it may concern:*

Be it known that I, ERNEST N. HUMPHREY, a citizen of the United States, residing in New Britain, in the county of Hartford and State of Connecticut, have invented certain new and useful Improvements in Hose-Supporters, of which the following is a specification.

The present invention relates to those garment holders or supporters which embody a joint with which a detachable connection may be made for the purpose of ready casting off.

One of the most important features of the present improved supporter embraces a member with which the cast-off is adapted to engage in any rotary position of such member relatively to the other parts of the joint, thus permitting connection to be made without the necessity of first bringing the member into a definite relation with the cast-off or hook.

The present invention is particularly suited for application to a hose-supporter of that class in which a gripper depends from the joint and in which there is embodied a band or strap for encircling the calf of the wearer.

In the drawings accompanying the present specification, Figure 1 is a view illustrating a hose-supporter embodying my invention as the former appears when in use. Fig. 2 is an enlarged elevational view illustrating the joint and the chapes or connectors and the hook or cast-off, together with portions of the gripper-suspender and the encircling band. Fig. 3 is a sectional view taken through the pivotal axis of the joint. Fig. 4 is a detail view of the hanger for the gripper-suspender and in which hanger the ball-receiving slots are formed. Fig. 5 is a similar view of the chape or connector for the fixed end of the band and which constitutes one of the ball-races. Fig. 6 is a similar view of the member with which the cast-off or hook of the band may be connected and which constitutes the oppositely-disposed ball-race. Fig. 7 is a detail view of the hollow rivet defining the pivotal axis about which the parts of the joint turn.

Similar characters of reference designate corresponding parts in all figures.

When applied to a joint construction for a hose-supporter, the present invention ordinarily comprises a three-part joint, one of which parts serves for the connection of the fixed end of the encircling band, another of which parts serves for the detachable connection therewith of the cast-off or hook on the detachable end of the band, and the third of which parts constitutes a hanger from which the hose-gripper is suspended. These several parts, each capable of separate pivotal movement about the axis of the joint, not only serve the purpose of retaining the parts of the supporter in position, but also enable them to conform to varying changes in direction of pull when in use. The present joint includes in its construction, furthermore, antifriction-balls for the purpose of minimizing the resistance to turning offered by the joint.

In the illustrated construction the hanger or connector for the gripper-suspender is located between the connector for the fixed end of the band and the member for the detachable connection of the cast-off or hook. The hanger is provided with ball-receiving and ball-retaining slots, while the races for the balls are formed by the aforesaid connector and member on opposite side of the hanger. The parts of the joint are assembled on a hollow (preferably) rivet defining the pivoted axis of the joint. The joint-forming parts are ordinarily made from thin metal.

Referring to the drawings, 2 designates a hanger, which is here provided with an elongated eye 3 for the attachment of a suspender 4, from which depends a suitable gripping device—as, for instance, that illustrated and designated by 5—for gripping the hose. The ball receiving and retaining slots 6 are in this instance three in number, and in each is located an antifriction-ball 7. Each slot is curved from the pivotal axis of the hanger as a center, the radial movement of the balls being prevented by the inner and outer curved walls, while the ends of the slots determine the back-and-forth play of the respective balls.

At one side of the hanger 2 is located a chape or connector 8, having an elongated eye 9 for the attachment of the fixed end of the band 10. This connector is pivotally mounted in close proximity to the hanger and is provided with a bulged or cup-shaped portion 11, constituting the ball-race on that side.

The member 12, with which the cast-off (such as the hook 13) at the opposite end of the band may be engaged, is located on the opposite side of the hanger 2 and is likewise pivotally mounted with relation thereto. If this member, which serves for the detachable connection of the hook in arranging the harness in place, is of such form and construction as to necessitate a definite positioning of the same in the act of hooking up, considerable annoyance and inconvenience is experienced, since such member must be first brought into such definite relation before the hook can be engaged with it. This is especially true if such member is unbalanced with reference to the pivotal axis of the joint, when it then upon the release of the hook drops to some position other than that in which immediate hooking up may be effected. For the purpose of eliminating such a source of inconvenience in hooking up the present member is of a form and construction such as to permit the engaging of the hook in practically any position that such member may assume. In this instance such member is disk-like in form, the outer hook-engageable periphery 14 of which is connected to the center portion by cross-pieces 15. The distance between consecutive cross-pieces 15 is substantially equal to the width of the hook 13, whereby the pivotal turning of the member 12 about the axis of the joint is assured and the sliding of the hook along the part with which it is engaged prevented. The center portion of this member 12 constitutes, as already stated, an opposed ball-race 11. The two ball-races may, if desired, have openings 16. The encircling band 10 may also be provided with a take-up 19.

The parts of the joint assembled with their pivot-receiving openings in line are secured loosely together by a pivot-pin 17, preferably hollow and having a head, such as 18, the opposite end of the pin being riveted over.

Having thus described my invention, I claim—

1. A joint with which a cast-off is adapted to be engaged and from which it is adapted to be disengaged, the same comprising a connector and a member pivoted with relation thereto and having a plurality of parts disposed around the pivotal axis of the joint with each of which parts said cast-off is engageable.

2. The combination with a joint comprising a connector, of a band one of whose ends is secured to said connector; a cast-off secured to the opposite end of the band; and a member pivoted with relation to said connector and having a plurality of parts disposed around the pivotal axis of the joint with each of which parts said cast-off is engageable.

3. The combination with a joint comprising a connector, of a band one of whose ends is secured to said connector; a cast-off secured to the opposite end of the band; and a disk-like member pivoted with relation to said connector and having a plurality of parts disposed around the pivotal axis of the joint with each of which parts said cast-off is engageable.

4. The combination with a joint comprising a connector, of a band one of whose ends is secured to said connector; a hook secured to the other end of said band; and a disk-like hook-engageable member pivoted with relation to said connector and having around its periphery a number of hook-receiving openings separated by cross-pieces.

5. The combination with a joint comprising a connector, of a band one of whose ends is secured to said connector; a hook secured to the opposite end of said band; a disk-like hook-engageable member pivoted with relation to said connector and having a plurality of parts disposed around the pivotal axis of the joint with each of which parts said hook is engageable; and a ball-bearing between said member and said connector.

6. In a hose-supporter the combination with a joint comprising, a hanger and a connector, of a band, one of whose ends is secured to said connector; a cast-off secured to the opposite end of the band; and a member pivoted with relation to the hanger and connector and having a plurality of parts disposed around the pivotal axis of the joint with each of which parts said cast-off is engageable.

7. In a hose-supporter, the combination of a hanger; a connector; a band one of whose ends is secured to said connector; a hook secured to the other end of said band; a member having a plurality of hook-receiving openings; a pivot-pin upon which said member, said connector, and said hanger are journaled; and antifriction-balls interposed between the parts.

8. In a hose-supporter, the combination of a hanger provided with a plurality of ball-receiving slots; antifriction-balls in said slots; a connector on one side of said hanger for the supporter-band; a hook; a hook-engageable member on the opposite side of said hanger, and provided at its periphery with a plurality of hook-receiving openings, said connector and member being provided with ball-races; and a pivot-pin defining the pivotal axis of the parts.

9. In a hose-supporter, the combination of a hanger provided with a plurality of ball-receiving slots; antifriction-balls in said slots; a connector on one side of said hanger for the supporter-band; a hook; a hook-engageable member on the opposite side of said hanger, and provided at its periphery with a plurality of hook-receiving openings separated by cross-pieces, said connector and member being provided with ball-races; and a pivot-pin defining the pivotal axis of the parts.

10. In a hose-supporter, the combination with a centrally-located hanger and which is provided with a plurality of ball-receiving slots whose walls determine the movement of the balls, of antifriction-balls in said slots; a connector for the encircling band of the supporter and which connector is located on one side of said hanger and formed with a ball-race; a hook; a hook-engageable member located on the opposite side of said hanger and provided with a plurality of hook-receiving openings and which is also formed with a ball-race; and a pivot-pin defining the pivotal axis of the parts.

11. In a hose-supporter the combination with a hanger provided with a plurality of ball-receiving slots, of antifriction-balls in said slots; a connector located on one side of said hanger and formed with a cup-shaped portion constituting a ball-race; a band, one of whose ends is secured to said connector; a cast-off secured to the opposite end of the band; a disk-like member provided with a plurality of parts disposed around the periphery of the member with each of which parts said cast-off is engageable, said member being provided with a cup-shaped portion constituting a ball-race; and a pivot-pin connecting the hanger, connector and disk-like member.

ERNEST N. HUMPHREY.

Witnesses:
STANLEY PARKER,
MARGARET A. GORMAN.